(12) United States Patent
Lappalainen et al.

(10) Patent No.: US 6,489,392 B1
(45) Date of Patent: Dec. 3, 2002

(54) FOAMED RESIN ADHESIVE AND THE USE THEREOF OF GLUEING WOOD BASED PANELS AND BOARDS

(75) Inventors: Esa Lappalainen, Neuvoton (FI); Niko Musakka, Lappeenranta (FI)

(73) Assignee: Dynea Chemicals Oy, Helsinki (FI)

( * ) Notice: Subject to any disclaimer, the term of this patent is extended or adjusted under 35 U.S.C. 154(b) by 0 days.

(21) Appl. No.: 09/623,755

(22) PCT Filed: Jun. 17, 1998

(86) PCT No.: PCT/FI98/00523

§ 371 (c)(1),
(2), (4) Date: Sep. 8, 2000

(87) PCT Pub. No.: WO99/40349

PCT Pub. Date: Sep. 16, 1999

(30) Foreign Application Priority Data

Mar. 9, 1998 (FI) .................................................. 980525

(51) Int. Cl.⁷ .............................................. C09J 161/00
(52) U.S. Cl. ........................... 524/555; 156/78; 524/52; 524/53; 524/156; 524/501; 524/510; 524/537; 524/539; 523/218
(58) Field of Search .............................. 156/78; 524/52, 524/53, 156, 801, 501, 510, 537, 539, 555; 523/218

(56) References Cited

U.S. PATENT DOCUMENTS

| | | | |
|---|---|---|---|
| 3,905,921 A | | 9/1975 | Cone et al. |
| 4,115,178 A | | 9/1978 | Cone et al. |
| 4,258,088 A | | 3/1981 | Cone et al. |
| 4,403,013 A | | 9/1983 | Robitschek et al. |
| 4,470,789 A | | 9/1984 | Whittington et al. |
| 5,407,980 A | * | 4/1995 | Pizzi et al. .................... 524/14 |
| 5,556,906 A | * | 9/1996 | Collins et al. ........... 156/331.3 |

FOREIGN PATENT DOCUMENTS

| | | | |
|---|---|---|---|
| JP | A59012982 | 1/1984 | |
| JP | 59012982 A1 | * 1/1984 | ........... C08L/61/20 |

OTHER PUBLICATIONS

Abstract Japanese Patent 59012982 Jul. 15, 1982.
Abstract Japanese Patent 58224742 Jun. 23, 1982.

* cited by examiner

Primary Examiner—David W. Wu
Assistant Examiner—Kelechi C. Egwim
(74) Attorney, Agent, or Firm—Birch, Stewart, Kolasch & Birch, LLP

(57) ABSTRACT

A foamed resin adhesive and its use for glueing wood based panels and boards such as plywood. The adhesive comprises 40–80% of an aqueous resin solution, 2–10% of an organic filler or fillers, 1–10% of a cationic acrylamide copolymer, and 0.05–1% of a surface active agent.

13 Claims, No Drawings

FOAMED RESIN ADHESIVE AND THE USE THEREOF OF GLUEING WOOD BASED PANELS AND BOARDS

This application is the national phase under 35 U.S.C. §371 of PCT International Application No. PCT/FI98/00523 which has an International filing date of Jun. 17, 1998, which designated the United States of America.

The present invention relates to a foamed resin adhesive and its use for glueing wood based panels such as plywood.

With respect to glueing wood based panels and boards, quality and environmental requirements have clearly increased recently. The main purpose has been the reduction of the inevitable emissions in the working environment due to the application of the adhesive, for instance with the conventional spraying technique. On the other hand, there is a need to decrease the amount of the adhesive used for economic and ecologic reasons. Further, if the production of such wood based panels is fluctuating the premature setting of the adhesive can occasionally cause problems.

In comparison to traditional alternative spreading methods, uniform and adequate glueing results are obtained with present methods using less foamed phenolic resin adhesives. The foaming of the phenolic resins helps to reduce the contamination of the surroundings of the production lines. The foam also binds possible emissions and odours better than common methods. The foaming of the resin to increase its volume reduces the need of water and thus failures of the glue line due to excessive moisture are avoided during hot pressing. Foamed phenolic resin adhesive can be spread extremely evenly on the surface to be glued that may even be rough and irregular. The adhesive penetrates less into the materials being glued and it sets more slowly. In most common methods using foamed phenolic resin as an adhesive the foaming and the simultaneous stabilizing of the foam is accomplished with dried and powdered animal blood from slaughterhouses. The blood protein in combination with a surface active agent foams the adhesive quickly and stabilizes the foamed adhesive to a useful form for a time period required.

The U.S. Pat. No. 3,905,921 describes a rapidly foaming and setting phenolic resin adhesive especially for glueing plywood panels. A basic 30–45% resin solution containing as a resin a condensation product of a phenol and an aldehyde, especially of a phenol and formaldehyde is mixed with 5–30% dried powdered animal blood, water. and a suitable amount of glyoxal or other aldehyde to control the viscosity of the adhesive. This blood was collected from the floors of slaughterhouses, then dried, and powdered. However, such an animal blood from slaughterhouses can be a potential source of causative agents of sicknesses that can be transmitted from this blood to humans. Accordingly, the use of such an animal blood can be questionnable for health and ecologic reasons. Moreover, the quality of this blood varies causing uncontrolled changes in the properties of the adhesive.

The U.S. Pat. No. 4,403,013 relates to a foamable thermosetting adhesive for the production of plywood. This adhesive comprises a phenolic resin such as a phenol-formaldehyde resin mixed with a fatty acid amide or tertiary amine oxide as a surface active agent necessary for foaming. The foam is stabilized with clay, for instance attabulgit, which is mainly a crystalline hydrated magnesium aluminium silicate. The adhesive comprises further a thickener, such as flour from wheat, rye, potato, or natural rubber etc. A basic compound such as sodium carbonate is also added to the adhesive to adjust its pH above 9. The components of the adhesive are brought together and mixed, then air, nitrogen or any other gas inert to the mixture is fed into it with vigorous agitation to foam the adhesive.

A convenient extrusion equipment for foaming the adhesive and spreading it on wooden boards is disclosed in the U.S. Pat. No. 4,470,789. In this equipment a liquid adhesive mixture is fed via a pump through a separate line to a foaming unit for mixing a gas, typically air, to it. The obtained foam is fed through a spreading head onto the surfaces being glued.

The foamed adhesive could also be applied on wood based boards according to the process described in the U.S. Pat. No. 4,115,178, further comprising the steps of mechanical prepressing and the actual hot pressing.

The U.S. Pat. No. 4,258,088 discloses a process for producing plywood panels. In this intermittent process a foamed plywood adhesive is applied uniformly on moving surfaces being glued.

The object of the present invention is to provide a foamable resin adhesive for glueing wood based boards such as plywood panels without any animal products to foam and stabilize the adhesive. Another object of the invension is to provide a foamable adhesive that can be foamed easily and quickly, the stability, density, viscosity and other properties of the foamed adhesive being suitable for glueing especially of wood based panels and boards such as plywood, chipboard, hardboard, oriented strand board, and wafer board.

The characteristic features of the foamable resin adhesive and its use to glue wooden boards according to the present invention are presented in the appended claims.

The resin adhesive of the present invention comprises a thermosetting resin such as phenol-formaldehyde, resorcinol-formaldehyde, urea-formaldehyde, or melamine-formaldehyde resin, or mixtures or combinations thereof, an organic filling material or materials, a cationic acrylamide copolymer, a surface active agent, water, and a base. The components are mixed together in a conventional manner, for instance according to the U.S. Pat. No. 4,403,013. The proportion of the resin that is preferably added as an aqueous phenol-formaldehyde resin solution is in the range of 40–80%, preferably 50–75%. The dry matter content of this phenol-formaldehyde resin is between 35 and 65%, preferably between 40 and 50%, and the molar ratio of formaldehyde to phenol varies between 1.8 and 2.8. The resin was produced by using inorganic alkaline catalysts with hydroxyl correlation of 3–10%. Preferable inorganic alkaline catalysts include alkaline and alkaline earth metal hydroxides, oxides and salts of weak acids. The filling material such as wheat, rye or potato flour, starch, natural rubber, wood flour, cellulose derivatives or alginates is added in an amount of 2–10%, preferably 5–8%. The proportion of the cationic acrylamide copolymer is between 1 and 10%, preferably 2 to 5%, this copolymer being typically added as a 10–50% aqueous solution with a cationic ratio of 20–100%, preferably 30–80%, a molecular weight of 10,000–300,000, preferably more than 50,000, and with a pH-value between 2 and 4. Further, it is preferable to add to the adhesive an anionic or neutral surface active agent such as sodium alkyl sulfate. sulfonized alcohol ethoxylate, alfa-olefin sulfonate, or alkyl benzene sulfonate. The cationic acrylamide copolymer can be produced from monomers comprising acrylamide or monomers in a copolymeric cationic form such as a quaternary alkyl-N-alkylamine of acrylamide, a secondary or tertiary alkyl-N-alkylamine of acrylamide or a primary acrylamine, an ester of an acrylic acid, the alcohol moiety of which being a quaternary N-alkylamine alkoxide, or a secondary or tertiary N-alkylamine alkoxide or a primary aminealkoxide. The most preferable surface active agent is sodium (2-ethylhexyl)sulfate to be added in the proportion of 0.05–1%, preferably 0.1–0.5%. Moreover, a base like sodium hydroxide, sodium carbonate or any other basic compound with which the pH of the mixture can be adjusted above 9, and 5–50% water can be added to this adhesive mixture. The foaming of the mixture is preferably accomplished using high shear, for instance with known foaming devices, by introducing into this mixture a gas inert to it, such as nitrogen or air, preferably air.

The invention will now be described in more detail in the following example relating to a preferable embodiment that should be considered as illustrating, not limiting the invention.

EXAMPLE 1

60 weight-% of an aqueous phenol-formaldehyde resin solution with a solids content of 40–50%, molar ratio of 1.8–2.8, produced by using inorganic alkaline catalysts with a hydroxyl correlation of 3–10%, 7% starch, 3% cationic acrylamide copolymer (25% aqueous solution, with a cationic ratio of 45%, molecular weight of more than 100,000, pH=3), 0.5% sodium (2-ethylhexyl)sulfate, 29.5% water and sodium hydroxide were mixed together in a conventional manner and in a conventional order to obtain a homogeneous dispersion. The adhesive resin was mixed with air to provide a stable foam that was fed through an extruder to glue together wood based boards. The foaming characteristics of the adhesive of this invention, foam stability and density were comparable with commercial products foamed with animal blood.

What is claimed is:

1. A foamable resin adhesive for glueing wood based boards wherein the adhesive comprises 40–80% of an aqueous resin solution, 2–10% of an organic filler or fillers, 1–10% of a cationic, acrylamide copolymer, and 0.05–1% of a s active agent.

2. The resin adhesive according to claim 1, characterized in that it comprises 50–75% of an aqueous resin solution, 5–8% of an organic filler or fillers, 2–5% of a cationic acrylamide copolymer, 0.1–0.5% of a surface active agent, 5–50% water, and a base.

3. The resin adhesive according to claim 1 or 2, characterized in that the resin is a phenol-formaldehyde, resorcinol-formaldehyde, urea-formaldehyde, or a melamine-formaldehyde resin, or a mixture or a combination thereof.

4. The resin adhesive according to claim 3, characterized in that the phenol-formaldehyde resin has a solids content of 35–60%, with the molar ratio of formaldehyde to phenol being 1.8–2.8, and is produced by using inorganic alkaline catalysts with a hydroxyl correlation of 3–10%.

5. The resin adhesive according to claim 1, characterized in that the organic filler is a starch containing material.

6. The resin adhesive according to claim 1, characterized in that the cationic acrylamide copolymer has a catonic ratio of 20–100%, and a molecular weight between 10,000 and 300,000.

7. The resin adhesive according to claim 1, characterized in that the cationic acrylamide copolymer is produced from monomers selected from the group consisting of acylamide; a quaternary alkyl-N alkylamine of acrylamide; a primary acrylamine; a secondary alkyl-N-alkylamine of acrylamide; a tertiary alkyl-N-alkylamine of acrylamide; an ester of an acrylic acid, the alcohol moiety of which is a quaterary N-alkylamine alkoxide; a secondary N-alkylamine alkoxide; a tertiary N-alkylamine alkoxide; and a primary aminealkoxide.

8. The resin adhesive according to claim 1, characterized in that the surface active agent is an anionic or neutral compound.

9. The resin adhesive according to claim 4, wherein the phenol-formaldehyde resin has a solids content of 40–50%.

10. The resin adhesive according to claim 6, wherein the cationic ratio is 30–60%.

11. The resin adhesive according to claim 6 or 10, wherein the molecular weight of said cationic acrylamide copolymer is between 50,000 and 300,000.

12. The resin adhesive according to claim 8, wherein the surface active agent is selected from the group consisting of sodium alkyl sulfate, sulfonized alcohol ethoxylate, alfa-olefin sulfonate and alkyl benzene sulfonate.

13. The resin adhesive according to clam 12, wherein he surface active agent is sodium (2-ethylhexyl) sulfate.

* * * * *